United States Patent
Cole et al.

(10) Patent No.: US 6,260,152 B1
(45) Date of Patent: Jul. 10, 2001

(54) METHOD AND APPARATUS FOR SYNCHRONIZING DATA TRANSFERS IN A LOGIC CIRCUIT HAVING PLURAL CLOCK DOMAINS

(75) Inventors: Steven R. Cole, San Jose; Russell T. Baca, Fremont, both of CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/126,430

(22) Filed: Jul. 30, 1998

(51) Int. Cl.[7] ............................ G06F 1/12; G06F 1/04; G06F 1/24; G06F 13/42; G06F 11/00
(52) U.S. Cl. .................. 713/400; 709/400; 713/500; 713/502; 713/503; 713/600
(58) Field of Search .................... 713/400, 500, 713/502, 503, 600; 709/400; 714/814, 815

(56) References Cited

U.S. PATENT DOCUMENTS

| | | | |
|---|---|---|---|
| 3,665,405 | 5/1972 | Sanders et al. | 340/172.5 |
| 3,751,597 | 8/1973 | Bonyhard | 179/15 AQ |
| 3,914,553 | 10/1975 | Melindo et al. | 179/15 AT |
| 4,021,784 | * 5/1977 | Kimlinger | 713/400 |
| 4,589,019 | * 5/1986 | Dischert | 713/500 |
| 5,638,015 | 6/1997 | Gujral et al. | 327/144 |
| 5,668,982 | * 9/1997 | Davis | 713/500 |
| 5,790,842 | * 8/1998 | Charles | 713/600 |
| 5,835,752 | * 11/1998 | Chiang | 713/502 |
| 5,860,003 | * 1/1999 | Eidler | 713/500 |
| 5,909,563 | * 6/1999 | Jacobs | 713/501 |
| 5,987,081 | * 11/1999 | Csoppenszky et al. | 375/354 |
| 6,021,503 | * 2/2000 | Pax et al. | 713/400 |
| 6,055,285 | * 4/2000 | Alston | 375/372 |
| 6,078,623 | * 6/2000 | Isobe et al. | 375/259 |
| 6,098,139 | * 8/2000 | Giacobbe et al. | 710/129 |
| 6,107,855 | * 8/2000 | Wilcox | 327/295 |

* cited by examiner

Primary Examiner—Thomas Lee
Assistant Examiner—Tanh Nguyen

(57) ABSTRACT

A synchronization circuit (30) includes three flip-flops responsive to a common clock signal (CLK2). The input to the first flip-flop (32) represents the least significant bit (LSB) of a counter (31) included within a first clock domain. The CLK2 signal originates from a second clock domain. The output of the first flip-flop is provided as input to the second flip-flop (34), and the second flip-flop output is provided as input to the third flip-flop (36). An exclusive-or (XOR) gate (38) generates a synchronization signal in response to outputs of the second and third flip-flops (34–36). The synchronization signal is usable within the second clock domain and activate for one period of CLK2 subsequent to every transition occurring on the LSB input. The active state of the synchronization signal indicates that a predefined set of data inputs is stable and valid. In this manner, a single unsynchronized input signal, i.e., the LSB input, can be used to synchronize the data inputs.

13 Claims, 4 Drawing Sheets

METHOD AND APPARATUS FOR SYNCHRONIZING DATA TRANSFERS IN A LOGIC CIRCUIT HAVING PLURAL CLOCK DOMAINS

BACKGROUND OF THE INVENTION

The present invention relates generally to synchronizing circuits, and in particular, to a digital circuit for synchronizing multiple signals in systems having multiple clock domains.

DESCRIPTION OF THE RELATED ART

In an electronic system, it is common to have various sections of synchronous logic circuits operating with different clocks. These clocks are often unsynchronized, meaning there is no predefined relationship between their phases and/or frequencies. Each area of a circuit operated according to a common clock, unsynchronized with others, is typically referred to as a clock domain within the circuit. It should be noted that higher frequency synchronous clock signals can be derived from the common clock and used within the same domain.

Often, it is necessary to pass data between different clock domains. This can result in a problem that is referred to as "metastability." Metastability occurs when a data input to a clock edge-triggered logic element, such as a flip-flop or register, changes value contemporaneously with a clock transition. In this event, the output of the edge-triggered element oscillates for a finite period, during which its value is indeterminate. During this time, the output is considered "metastable." Metastability results in a data errors and unreliable operation.

To overcome problems caused by metastability, it is well known in the art to double-buffer unsynchronized inputs. An example of a double-buffer 14 is shown in FIG. 1. In FIG. 1, a prior art digital system 10 that includes a first circuit 12 operating in clock domain 1, and a second circuit 13, operating in clock domain 2. The second circuit 13 is a synchronous logic circuit using a common clock (CLK). Unsynchronized data passing from the first circuit 12 is synchronized to CLK by the double-buffer 14. The double-buffer 14 includes a first D-flip-flop 16 and a second D-flip-flop 18. Each of the flip-flops 16–18 transfers data on a common triggering edge of CLK. In the double-buffer 14, the output of the first flip-flop (Q0) can enter a metastable state following a triggering edge of CLK. However, it is well known that Q0 typically stabilizes prior to a subsequent triggering edge of CLK. Thus, the output of the second flip-flop 18 (Q1) is a reliable representation of the unsynchronized data input from the first circuit 12.

A drawback of the double buffering scheme shown in FIG. 1 is that each incoming unsynchronized signal requires its own double-buffer. Consequently, in modern digital systems having a multiplicity of signals crossing clock domain boundaries, the logic resources required to implement a double-buffer for every unsynchronized input becomes burdensome. For instance, providing a double-buffer for every unsynchronized signal in a very large scale integrated (VLSI) circuit requires large amounts of silicon area. This leads to higher power consumption, as well as increased manufacturing costs and circuit failure rates.

U.S. Pat. No. 5,638,015 discloses two alternative synchronization circuits, each having a section that includes a sequence of three flip-flops for synchronizing incoming signals. In spite of their apparent simplicity, these circuits are beset with serious drawbacks that limit their usefulness. For instance, the first circuit (FIG. 2 of the '015 patent), requires an input pulse having a one-clock period duration. In response to this input, the circuit generates only a level output. The second circuit (FIG. 3 of the '015 patent) detects only positive edge transitions on an unsynchronized input. These functional limitations reduce the usefulness of the '015 circuits. For example, in many logic circuits, it is necessary to generate a single pulse for every transition, positive or negative, occurring on an unsynchronized input. Neither of the circuits disclosed in the '015 patent is capable of providing this function.

Accordingly, there is a need for an improvement in synchronizing digital signals, one which is responsive to both positive and negative input edges, and which also results in lower power consumption, manufacturing costs, and failure rates.

SUMMARY OF THE INVENTION

It is an advantage of the present invention to provide a method and apparatus that overcomes the limitations and drawbacks of known techniques for synchronizing signals in a digital system. The present invention accomplishes this by providing an improved synchronization technique that does not require a double-buffer for every unsynchronized data signal crossing clock domain boundaries.

According to one aspect of the present invention, there is provided a synchronization circuit that includes three flip-flops responsive to a common clock signal (CLK). The input to the first flip-flop represents the least significant bit (LSB) of a counter included within a first clock domain. The CLK signal originates from a second clock domain. The output of the first flip-flop is provided as input to the second flip-flop, while the second flip-flop output is provided as input to the third flip-flop and an exclusive OR (XOR) gate. In response to outputs from the second and third flip-flops, the XOR-gate produces a synchronization signal for use within the second clock domain. The synchronization signal is active for one period of CLK, subsequent to every transition occurring on the LSB input. The active state of the synchronization signal indicates that a predefined set of unsynchronized data inputs are stable and valid. In this manner, a single unsynchronized input signal, i.e., the LSB input, can be used to synchronize a plurality of data inputs. This eliminates the need for a double-buffer on every unsynchronized data input. The counter provides additional benefit because its multi-bit output, including the LSB, can be used to control circuitry in either clock domain.

BRIEF DESCRIPTION OF THE DRAWING

Other features, objects and advantages of the present invention will become readily apparent and understood upon consideration of the following detailed description and attached drawings, wherein.

DETAILED DESCRIPTION OF THE INVENTION

Figure 1:
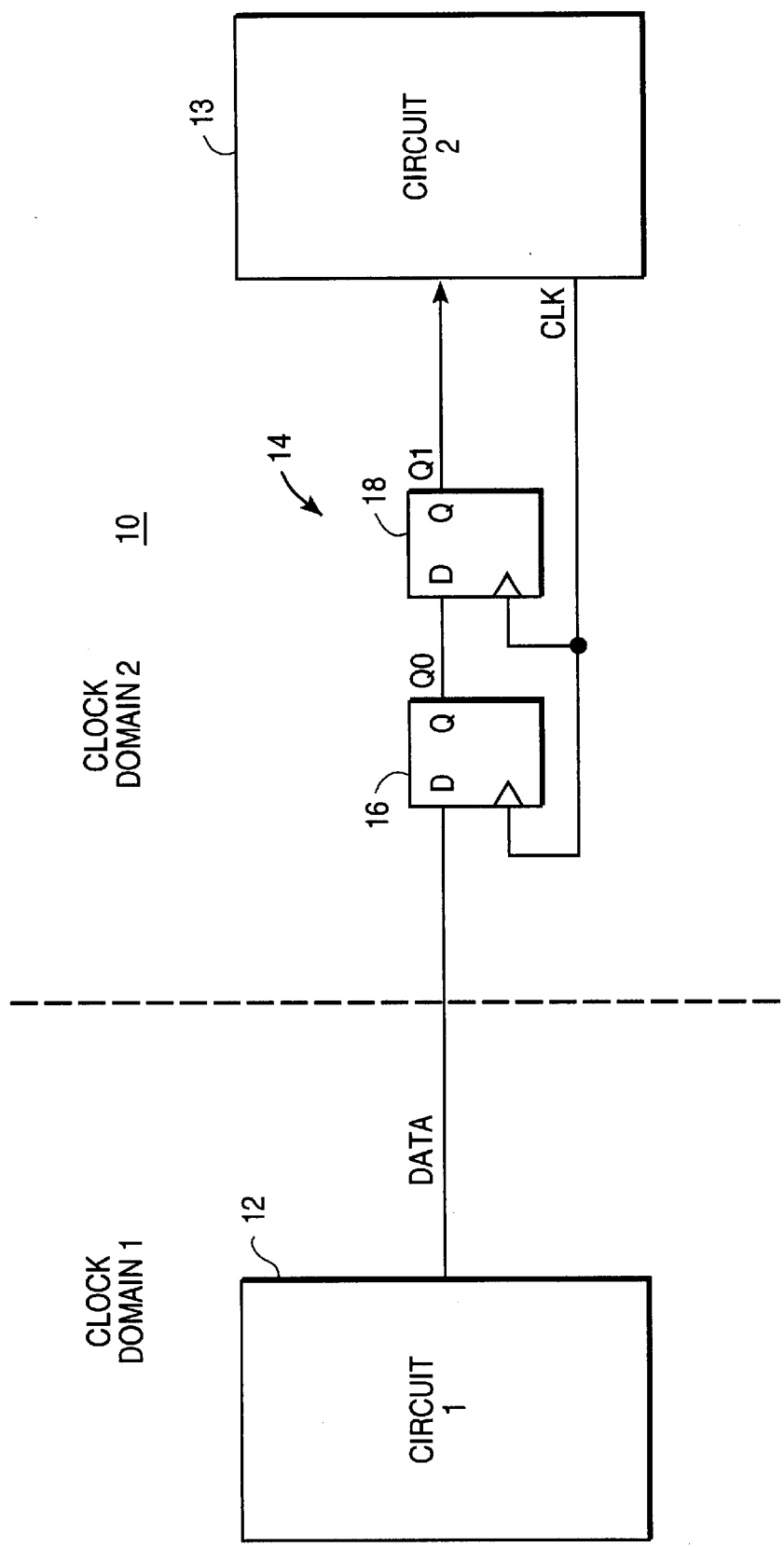
FIG. 1 illustrates a block diagram of a prior art electronic system including a double-buffer.
Figure 2:
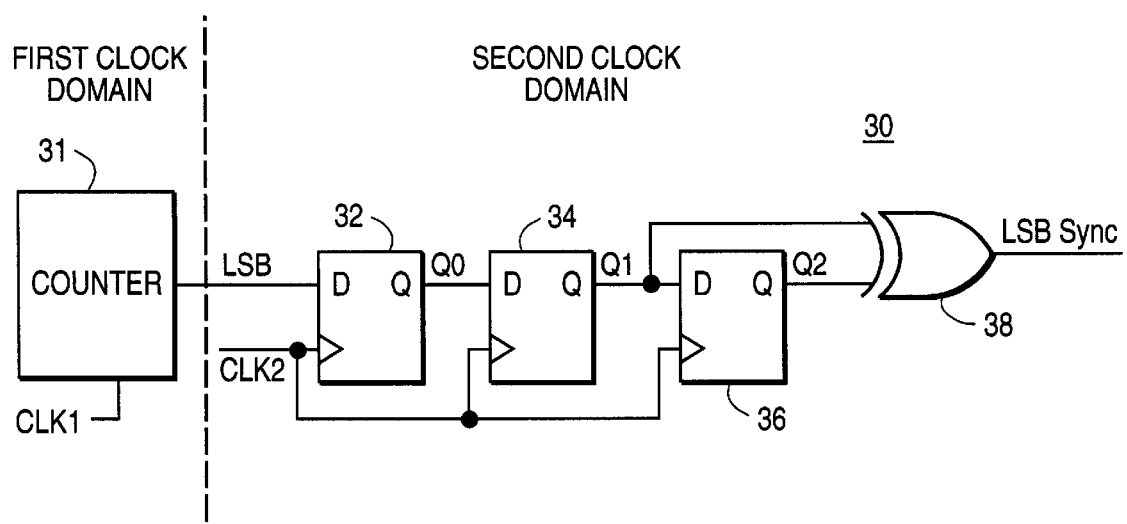
FIG. 2 illustrates a synchronization circuit in accordance with one embodiment of the present invention.

Turning now to the drawings, and in particular to FIG. 2, there is illustrated a logic circuit 30 that is in accordance with one embodiment of the present invention. The synchronization circuit 30 includes a counter 31, a first flip-flop 32, a second flip-flop 34, a third flip-flop 36, and an XOR-gate 38. The counter 31 resides in a first clock domain, and is incremented according to a first clock signal (CLK1). The flip-flops 32–36 reside in a second clock domain and are edge-triggered devices responsive to a second clock signal (CLK2). The clock signals CLK1 and CLK2 are unsynchronized relative to one another. According to one embodiment, CLK2 has a frequency greater than two times that of the LSB input.

The flip-flops can be any equivalent edge-triggered memory device, such as D flip-flops (shown), J–K flip-flops, or random access memory (RAM) cells. Each of the flip-flops 32–36 is triggered by transitions of CLK2 having the same direction, i.e., the flip-flops 32–36 all respond to either a positive edge or a negative edge of CLK2.

The input to the first flip-flop 32 (LSB) is generated by the counter 31. The counter 31 can be any type of digital counter that is capable of incrementing its output value in response to a clock signal. For example, the counter 31 can include a ripple counter, carry look ahead adder, etc. The counter 31 can produce a multi-bit output value that rolls over to zero upon reaching a predetermined maximum value. A single bit of the counter output is provided as input to the first flip-flop 32. Any of the counter output bits can be used by the first flip-flop 32, including the least significant bit (LSB) of the counter output, as shown.

The output of the XOR-gate 38 (LSB_SYNC) represents the synchronization signal, and accordingly, is provided to circuitry within the second clock domain.

Figure 3:
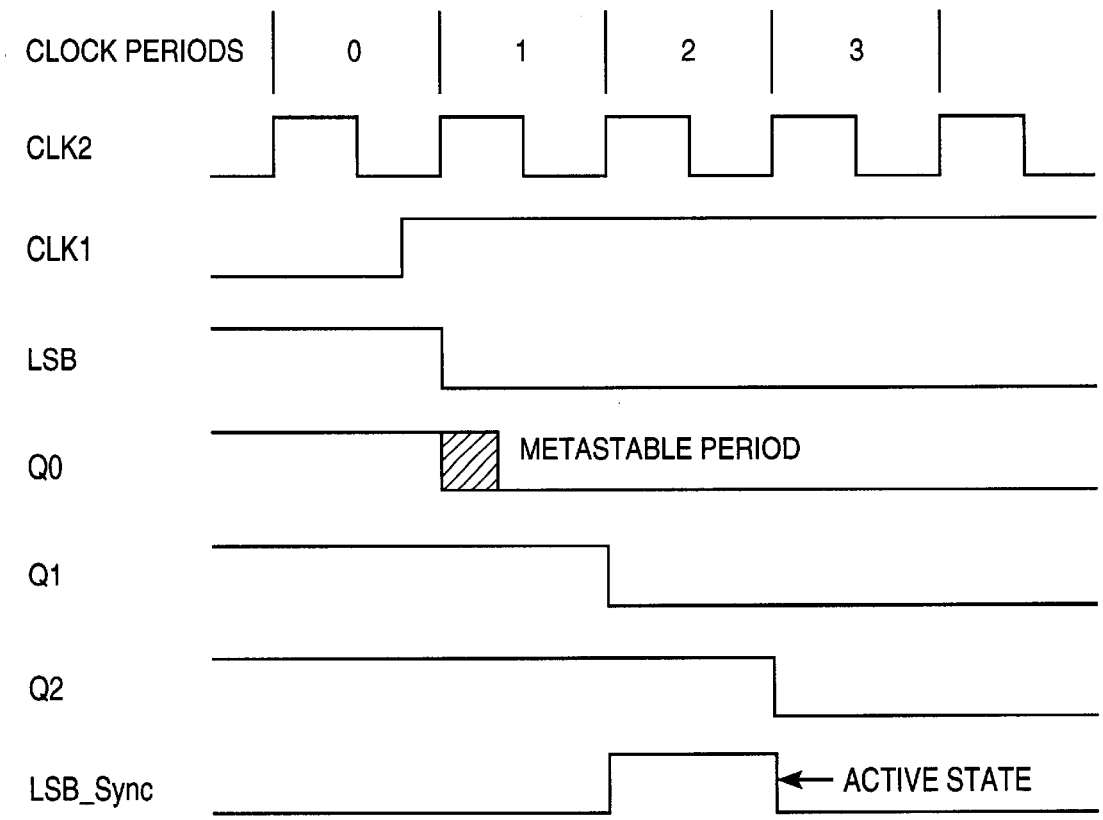
FIG. 3 illustrates a timing diagram corresponding to the circuit shown in FIG. 2.

FIG. 3 illustrates an timing diagram depicting an example of the operational characteristics of the synchronization circuit 30 of FIG. 2. As shown in the timing diagram, CLK2 is a constant frequency signal. The LSB input is not synchronized to CLK2, and a transition can occur on LSB at any time. In the example shown, a negative transition occurs on the LSB input during clock period 0 of CLK2. The LSB transition is triggered by a positive transition on CLK1.

In this example, the flip-flops 32–36 are triggered by the positive edges of CLK2. Thus, the LSB input transition is clocked into the first flip-flop 32 at the leading positive edge of clock period 1 of CLK2. The first flip-flop 32 may enter a metastable period, as shown in the trace line depicting output Q0. At the leading positive edge of clock period 2, the transition on the LSB input appears as the output of the second flip-flop 34 (Q1). Shortly thereafter, the LSB_SYNC output transitions to an active state. At the positive leading edge of clock period 3, the LSB transition appears on the output of the third flip-flop 36 (Q2). This causes the XOR-gate to subsequently return its LSB_SYNC output to the inactive state.

From the timing diagram of FIG. 3, it is apparent that the circuit 10 generates a one clock-period pulse in the second clock domain for each transition, positive and negative, occurring on the unsynchronized input (LSB). This feature of the circuit 10 provides advantage over prior art synchronization circuits, such as those discussed earlier herein.

Figure 4:
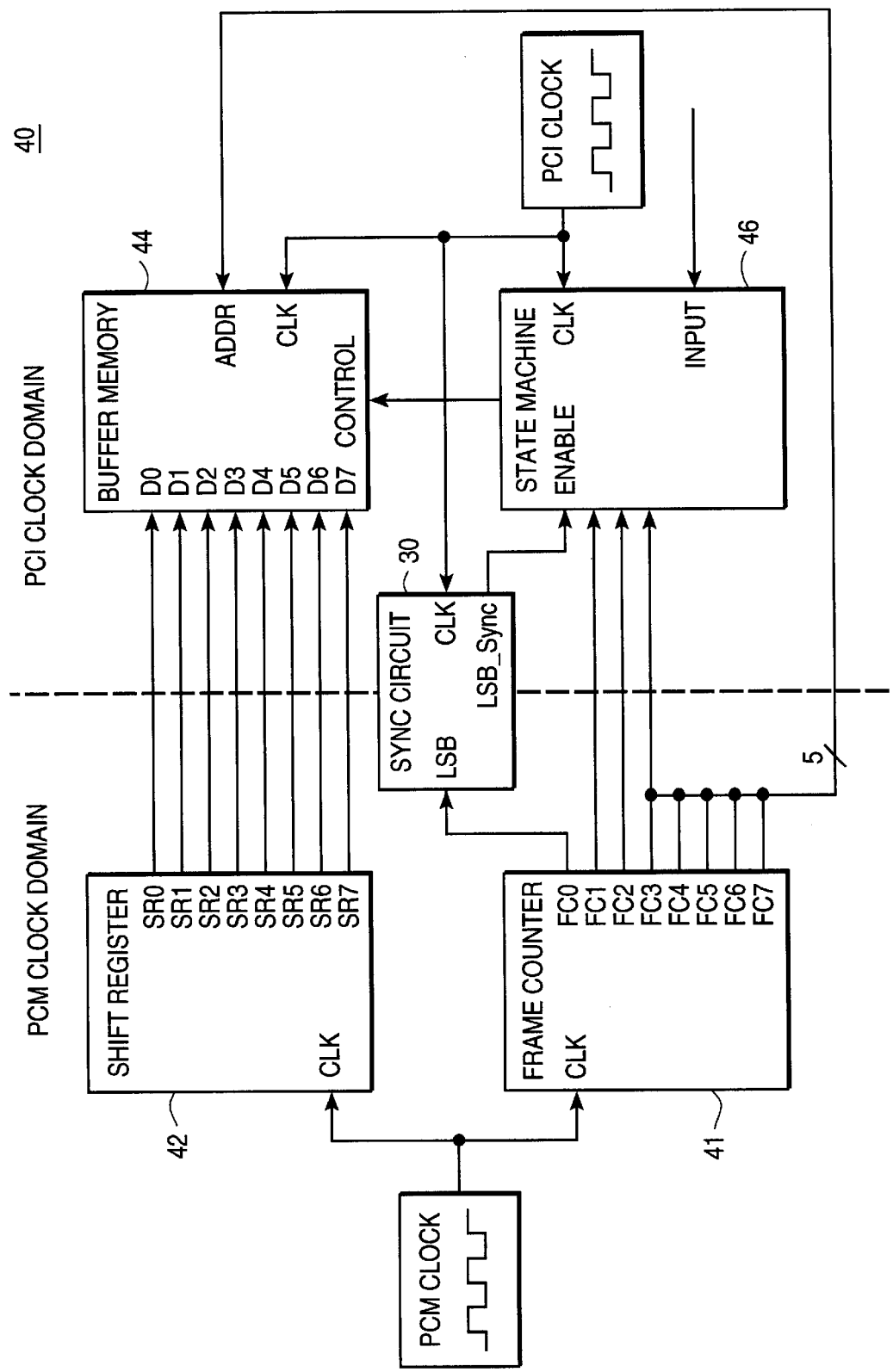
FIG. 4 illustrates an exemplary system in which the circuit of FIG. 2 can be used to synchronize multiple data signals passing between two independent clock domains in accordance with another embodiment of the invention.

FIG. 4 illustrates a block diagram of an exemplary logic circuit 40 incorporating the synchronization circuit 30 in accordance with another embodiment of the present invention. In addition to the synchronization circuit 30, the logic circuit 40 includes a frame counter 41, a shift register 42, a buffer memory 44 and a state machine 46. The frame counter 41 and shift register 42 reside within a first clock domain (PCM clock domain), while the buffer memory 44 and the state machine 46 reside in a second clock domain (PCI clock domain). The synchronization circuit 30 responds to a clock signal (PCI clock) originating in the second domain, and can be used to synchronize data transfers from the shift register 42 to the buffer memory 44.

Although the synchronization circuit 30 is usable within many different types of digital systems, the circuit 40 represents an interface between a pulse code modulated (PCM) data environment typically associated with telephony communications and a peripheral component interface (PCI) environment normally associated with personal computers. The PCM clock signal and the PCI clock signal are unsynchronized relative to one another.

In the example shown, the first clock domain represents a circuit for handling PCM voice data. PCM voice data is information that encoded and transmitted according to well known industry standards for telephony communications, such as the T1 carrier standard developed by Bell Laboratories. The frame counter 41 and the shift register 42 are synchronous devices that are responsive to the common PCM clock signal. The PCM clock can operate at a standard frequency of 2 MHz.

The frame counter 41 is a conventional digital counter which increments its output once every clock period. In the example shown, the frame counter provides an 8-bit output. The output represents a bit position for the 256 bits included in a T1 standard PCM data frame. The least significant bit (LSB) of the counter output (FC0) is provided to the synchronization circuit 30 as the LSB input. The other output bits (FC1–FC7) of the frame counter 41 can be used as control signals in either clock domain. In the example shown, FC1–FC3 are provided to the state machine 46 as control inputs.

The shift register 42 is an example of one circuit that can exist within the PCM clock domain. The shift register 42 serially shifts a PCM input bit during every PCM clock period. The shift register 42 performs a serial to parallel conversion of incoming PCM serial data, and provides an 8-bit PCM output to the buffer memory 44.

The components within the PCI clock domain (the buffer memory 44 and state machine 46) can be included in a circuit operating in conformity with industry standards for the PCI bus protocol. The buffer memory 44 and the state machine 46 are synchronous circuits which respond to the PCI clock. The PCI clock can operate at a standard frequency of 33 MHz.

The buffer memory 44 receives parallel data output from the shift register 42. The buffer memory 44 can be any memory device for storing digital data, such as a register or random access memory (RAM). The buffer memory 44 is controlled by the state machine 46.

The LSB_SYNC output of the synchronization circuit 30 is provided to the state machine 46, as enable input. The state machine 46 changes state and is responsive to FC1–FC3 only when the LSB_SYNC signal is active. The state machine 46 can be any finite state machine having a plurality of different states. In the example shown, the state machine 46 provides a control signal to the buffer memory 44.

Transitions between states can be a function of FC1–FC3. For instance, the state machine can have three states for detecting a predetermined sequence of three values appearing on FC1–FC3. Upon detecting the sequence, the buffer control output can be enabled while the synchronization signal is active. The sequence detection is accomplished by initializing the state machine to a first state. The state machine 46 transitions to a second state upon detecting the first value in the sequence while the LSB_SYNC is active. If the next value on FC1–FC3 is the second value in the sequence, the state machine 46 transitions to the third state. Otherwise, it returns to the first state. Upon reaching the third state, if the next value on FC1–FC3 is the third value in the sequence, the state machine 46 enables the buffer control output and transitions back to the first state, where it waits for another sequence. If, while in the third state, the next value is not the third value, the state machine 46 returns to the first state without enabling the buffer control.

The control signal, when enabled, allows the buffer memory to latch data inputs received from the shift register 42. The control signal is only enabled when the LSB_SYNC signal is active. In this fashion, the data outputs from the shift register 42 are read into the buffer memory 44 only when they are known to be valid and stable. Consequently, the otherwise unsynchronized inputs from the shift register 42 are synchronized with the operation of the buffer memory 44.

The counter outputs FC0–FC7 can also be used to provide an address (ADDR) to the buffer memory 44. In the example shown, FC3–FC7 are provided to the memory 44. This permits each byte shifted into shift register 42 to be stored at a unique location in the buffer memory 44. In this arrangement, the state machine 46 can be configured to assert the memory control signal whenever it detects transitions on FC3.

The circuits shown in FIGS. 2 and 4 can be implemented using any suitable logic circuitry, such as a combination of discrete logic components, or one or more application specific integrated circuits (ASICs).

Figure 5:
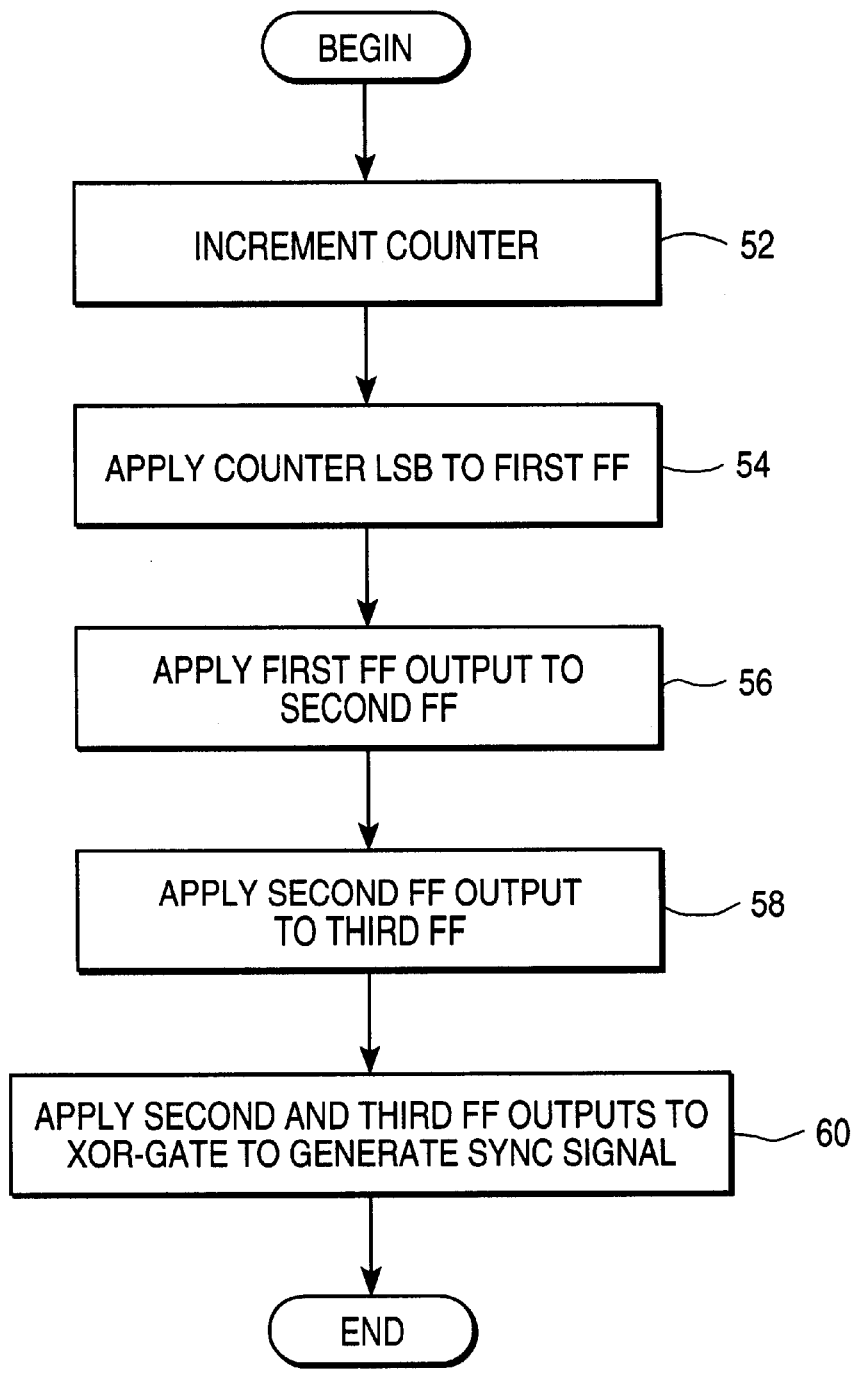
FIG. 5 illustrates a flow diagram of a method of synchronizing input signals in accordance with a further embodiment of the invention.

FIG. 5 illustrates a flow diagram of a method 50 of synchronizing input signals in accordance with a further embodiment of the present invention. In step 52, the output of the counter 31 is incremented according to a clock signal (CLK1) resident within the first clock domain. Incrementing the counter value causes a transition on the LSB of the counter output.

In step 54, the counter LSB is provided as input to the first flip-flop (FF) 32. The output of the first flip-flop 32 is updated according to a second clock signal (CLK2) originating within the second clock domain. In step 56, the output of the first flip-flop is provided as input to the second flip-flop 34. The output of the second flip-flop is likewise updated according to the second clock. In step 58, the output of the second flip-flop 36 is provided to the third flip-flop 38, which is also clocked by the second clock signal. In step 60, the outputs of the second and third flip-flops 36–38 are provided as inputs to the XOR-gate 38. The XOR-gate output represents the synchronization (sync) signal. The synchronization signal is active for one clock period following a transition, either positive or negative, on the counter LSB.

While the synchronization signal is active, the unsynchronized data inputs to the second clock domain are considered valid and stable. Thus, the synchronization signal can be used to control other logic components within the second clock domain, permitting these elements to respond to unsynchronized data signals from the first clock domain while these inputs are known to be valid and stable.

What is claimed is:

1. An apparatus for synchronizing a plurality of data signals passing between a first clock domain and a second clock domain in a logic circuit, comprising:
   means for counting included in the first clock domain;
   means included in the second clock domain for storing an output of the counting means responsive to a clock signal of the second clock domain;
   means included in the second clock domain for XORing a pair of outputs produced by the storing means, the XORing means generating an output pulse in response to a transition occurring on the counting means output; and
   means included in the second clock domain for receiving the data signals in the second clock domain as a function of the output pulse.

2. The apparatus of claim 1, wherein the counting means includes means for counting bits included in a frame of pulse code modulated (PCM) voice data.

3. The apparatus of claim 1, wherein the counting means output represents a least significant bit (LSB).

4. The apparatus of claim 1, wherein the receiving means is included in a peripheral component interface (PCI).

5. An apparatus for synchronizing a plurality of data signals passing between a first clock domain and a second clock domain in a logic circuit, comprising:
   a counter in said first clock domain generating a least significant bit (LSB) in response to a first clock signal;
   a first flip-flop included in the second clock domain inputting the LSB in response to a second clock signal unsynchronized to the first clock signal;
   a second flip-flop included in the second clock domain outputting the first flip-flop output in response to the second clock signal;
   a third flip-flop included in the second clock domain outputting the second flip-flop output in response to the second clock signal;
   an XOR-gate included in the second clock domain generating a synchronization signal in response to the second and third flip-flop outputs.

6. The apparatus of claim 5, further comprising a shift register outputting the data signals in response to the first clock signal.

7. An apparatus for synchronizing a plurality of data signals passing between a first clock domain and a second clock domain in a logic circuit, comprising:
   a counter generating a least significant bit (LSB) in response to a first clock signal;
   a first flip-flop outputting the LSB in response to a second clock signal unsynchronized to the first clock signal;
   a second flip-flop outputting the first flip-flop output in response to the second clock signal;
   a third flip-flop outputting the second flip-flop output in response to the second clock signal;
   an XOR-gate generating a synchronization signal in response to the second and third flip-flop outputs; and
   a finite state machine responsive to the synchronization signal.

8. The apparatus of claim 7, further comprising a buffer memory responsive to the data signals as a function of an output of the finite state machine.

9. The apparatus of claim 8, wherein the finite state machine and buffer memory are responsive to the second clock signal.

10. A method of synchronizing a plurality of data signals between a first clock domain and a second clock domain in a logic circuit, comprising:

incrementing a counter according to a first clock signal in said first clock domain to generate a transition of a counter output signal;

applying the counter output signal to a first edge-triggered storage device included in the second clock domain;

applying an output of the first edge-triggered device to a second edge-triggered device included in the second clock domain;

applying an output of the second edge-triggered device to a third edge-triggered device included in the second clock domain;

applying a second clock signal to the first, second, and third edge-triggered devices, the second clock signal being unsynchronized relative to the first clock signal;

applying outputs of the second and third edge-triggered devices to an XOR-gate included in the second clock domain to produce a synchronization signal; and receiving the data signals in the second clock domain as a function of the synchronization signal.

11. The method of claim 10, further comprising:

shifting a pulse code modulated (PCM) voice signal according to the first clock signal to generate the data signals.

12. A method of synchronizing a plurality of data signals between a first clock domain and a second clock domain in a logic circuit, comprising:

incrementing a counter according to a first clock signal to generate a transition of a counter output signal;

applying the counter output signal to a first edge-triggered device;

applying an output of the first edge-triggered device to a second edge-triggered device;

applying an output of the second edge-triggered device to a third edge-triggered device;

applying a second clock signal to the first, second, and third edge-triggered devices, the second clock signal being unsynchronized relative to the first clock signal;

applying outputs of the second and third edge-triggered devices to an XOR-gate to produce a synchronization signal;

receiving the data signals in the second clock domain as a function of the synchronization signal; and enabling a finite state machine responsive to the synchronization signal.

13. An interface circuit for transferring a plurality of data signals between a pulse code modulated (PCM) clock domain and a peripheral component interface (PCI) clock domain, comprising:

a counter in said PCM clock domain generating a multi-bit counter output including a least significant bit (LSB) in response to a PCM clock signal;

a first flip-flop in said PCI clock domain inputting the LSB in response to a PCI clock signal unsynchronized to the PCM clock signal;

a second flip-flop in said PCI clock domain outputting the first flip-flop output in response to the PCI clock signal;

a third flip-flop in said PCI clock domain outputting the second flip-flop output in response to the PCI clock signal;

an XOR-gate in said PCI clock domain generating a synchronization signal in response to the second and third flip-flop outputs;

a buffer memory in said PCI clock domain, responsive to the PCI clock signal, for storing the data signals at one or more addresses indicated by the counter output according to the synchronization signal.

* * * * *